United States Patent Office 3,243,387
Patented Mar. 29, 1966

3,243,387
PALLADIUM-SILVER-IRON OXIDE ON ALPHA-ALUMINA CATALYST COMPOSITION FOR THE SELECTIVE HYDROGENATION OF ACETYLENE
Hermann Blume, Joachim Münzing, and Emanuel Pindur, Leuna, Germany, assignors to Veb Leuna-Werke "Walter Ulbricht," Leuna, Germany
No Drawing. Filed Apr. 25, 1963, Ser. No. 276,131
5 Claims. (Cl. 252—466)

This invention relates to a selective catalyst, more particularly to a catalyst for the selective hydrogenation of acetylene.

When hydrocarbons are subjected to thermal decomposition for the recovery of ethylene, the main decomposition product is a gas rich in ethylene; however, a fraction will also be obtained in a subsequent gas separation plant which gas, in addition to ethylene, will also contain a certain amount of acetylene.

For a number of chemical syntheses, however, it is necessary to use ethylene which is completely free of acetylene and it is therefore necessary to remove the latter from the fraction above mentioned. The conventional method for that purpose is catalytic hydrogenation.

The primary requirement of a suitable catalyst for the above-mentioned purpose is that it should be selective in hydrogenating only the acetylene, but not the ethylene in the gas mixture. This result can be best checked by comparing the amount of hydrogen added before the reaction and by determining the remaining excess hydrogen after the reaction is completed.

It is known to utilize catalysts containing as active ingredients iron, cobalt, nickel, platinum, rhodium, or copper in metallic or oxide form. It is also known to use combinations such as nickel-copper, nickel-chrome, nickel-cobalt-chromium as catalysts in the selective hydrogenation of acetylene. The selectivity of all of these catalysts was found to be unsatisfactory. As a further improvement it is known to provide an active carrier, such as activated alumina with palladium and promoters, such as copper, silver and gold; or iron, rhodium or ruthenium. Another type of known improvement comprises the provision of a catalytically inactive carrier, such as diatomaceous earth, in combination with palladium and promoters such as copper, silver or gold. Generally the total amount of catalytically active components is up to 5% by weight of the total catalytic bulk, and the ratio of palladium to the promoter material is generally between 99:1 and 60:40.

The greatest drawback of the known palladium-type catalysts is their lack of selectivity, especially during the first four to six months of their operation. In order to accomplish with these catalysts a practically complete hydrogenation of acetylene, a volume ratio of 3:1 hydrogen to acetylene is necessary. By using this proportion, it was found that, after the catalytic treatment, no hydrogen was detectable in the gaseous product, which indicates that, at the same time some ethylene was also hydrogenated to form ethane.

It is an object of the present invention to provide a catalyst for the selective hydrogenation of acetylene in the presence of ethylene, whereby the desired degree of selective catalytic action can be accomplished within a few days as compared to several months when known catalysts are used.

It is another object of the invention to provide a selective catalyst for the hydrogenation of acetylene, the catalyst having a longer useful life than prior-art catalysts used for the same purpose.

Another object of the invention is to provide a selective catalyst for the hydrogenation of acetylene at temperatures lower than heretofore required.

The catalyst according to the invention is applied onto an inert carrier, such as α-alumina, the active ingredients being palladium, silver and iron. Palladium and silver are present in preferred quantities of up to 5% by weight calculated on the total weight of the catalyst, the proportion of the palladium being 60 to 99% by weight of total weight of both noble metals and the iron oxide being 19 to 80 times the total weight of palladium and silver.

The catalyst, according to the invention, is prepared in a manner known for acetylene hydrogenation. Accordingly, for example, α-alumina can be saturated with aqueous solutions of iron, silver and palladium salts, such as nitrates, and subsequently subjected to heat treatment. When using this method of preparation, it is advantageous to prepare a common solution containing all three ingredients as nitrates, thus requiring only a single impregnation step.

The best catalytic efficiency can be obtained within the temperature range of 100 to 140° C., which is about 60 to 100° C. lower than the optimum operating temperature for catalytic processes with the known palladium catalysts for acetylene hydrogenation. A further improvement over the known catalysts consists, when using the catalysts of the present invention, in that the required volume ratio of hydrogen to acetylene is lowered to substantially 2:1. As shown in the examples this ratio can be varied between 1.6:1 and 2.5:1. After the reaction has been completed, a slight hydrogen excess remains, which is further proof of the selectivity of the new catalyst.

In the following, some specific examples are to be given, wherein the percentages are by weight, unless otherwise indicated.

Example 1

100 ml. α-alumina grains, having a grain size of 3 to 5 mm. were impregnated with 30 ml. aqueous ferric nitrate solution having a concentration of 81.5 g. iron per liter. After the entire solution was absorbed by the alumina, the impregnated grains were dried for 12 hours at 105° C. and subsequently heat-treated for 4 hours at 450° C. The material thus pre-treated, was subsequently impregnated with 30 ml. of a solution containing per liter 2.34 g. palladium and 0.117 g. silver both present as nitrates. After repeated drying and heat treatment at the same temperatures, the catalyst contained 0.1% palladium, 0.005% silver, and 5% ferric oxide.

At a temperature of 130° C. and a pressure of 30 atmospheres, a gas mixture was passed over the catalyst at a rate of 1,000 liter/hour (reduced to normal pressure), the gas containing 77 parts by volume ethylene, 22 parts by volume ethane, 1.15 parts by volume acetylene and to which 2.3 parts by volume hydrogen were added, corresponding to a volume ratio of 2:1 hydrogen to acetylene. The hydrogenated gas was found to contain less than 0.001% by volume acetylene and 0.4% by volume hydrogen.

Example 2

100 ml. of α-alumina in tablet form being 5 mm. both in diameter and height, was impregnated in 30 ml. of an aqueous solution corresponding to the water absorption capacity of the carrier. Each liter of the solution contained the following amounts of the nitrates as listed below: 81.5 g. iron, 2.34 g. palladium and 0.117 g. silver. After the entire solution was absorbed by the alumina tablets, the material was subjected to a 12-hour drying period at 105° C. and, subsequently heat-treated for 4 hours at 450° C. The catalyst contained 0.1% palladium, 0.005% silver and 5% ferric oxide.

At 110° C. and 30 atmospheres pressure, the gas described in Example 1 was conducted over the catalyst at a rate of 600 liters/hour (reduced to normal pressure)

the hydrogen content here being 2.6 parts per volume, making the hydrogen to acetylene ratio 2.2:1. The hydrogenated gas contained less than 0.001% by volume acetylene and the hydrogen excess was 1.06% by volume.

For purposes of comparison, 600 liters/hour (reduced to normal pressure) of the same gas was conducted over a catalyst containing 0.1% palladium and 0.005% silver on an α-alumina carrier at 100° C. and a pressure of 30 atmospheres. The hydrogenated gas contained less than 0.001% by volume acetylene but practically no excess hydrogen, which indicated that, at the same time, some ethylene was also hydrogenated.

*Example 3*

100 ml. α-alumina having a grain size of 3 to 5 mm. was impregnated with 30 ml. of an aqueous ferric nitrate solution, containing 114.1 g. iron per liter. After the entire solution was absorbed by the alumina, the impregnated carrier was dried for 12 hours at 105° C. and subsequently heat-treated for 4 hours at 450° C. Similarly to the method described in Example 1, 0.1% palladium and 0.005% silver were added to the pretreated material, which also contained 7% ferric oxide.

At a temperature of 240° C. and a pressure of 30 atmospheres, a gas containing 77 parts by volume ethylene, 19 parts by volume ethane and 1.4 parts by volume acetylene and to which 2.3 parts by volume hydrogen had been added, was conducted at a rate of 600 liters/hour (reduced to normal pressure) over 100 ml. of the above described catalyst. The hydrogenated gas contained 0.003% by volume acetylene and 0.3% by volume hydrogen.

*Example 4*

100 ml. α-alumina grains, having a grain size of 3 to 5 mm., as described in Examples 1 and 3, were impregnated with a ferric nitrate solution containing 32.6 g./1 iron. The dried and heat-treated material was impregnated in the described manner with a solution containing palladium and silver nitrates, so that the prepared catalyst contained 0.1% palladium, 0.005% silver, and 2% ferric oxide.

A gas containing 75 parts by volume ethylene, 20 parts by volume ethane, 1.2 parts by volume acetylene and 3.0 parts by volume hydrogen was conducted over 100 ml. of this catalyst at a temperature of 100° C. and a pressure of 30 atmospheres at a rate of 600 liters/hour (reduced to normal pressure). The hydrogenated gas contained less than 0.001% by volume acetylene and 0.05% by volume hydrogen.

*Example 5*

100 ml. α-alumina in a form of tablets being 5 mm. both in diameter and height, were saturated with 30 ml. of an aqueous solution, corresponding to the water-absorption capacity of the carrier. The aqueous solution contained the nitrates of the following elements in the following g./1 concentration: 81.5 g. iron, 2.34 g. palladium, and 1.17 g. silver. After the entire solution was absorbed by the alumina tablets, they were dried for 12 hours at 105° C. and subsequently heat-treated for 4 hours at 450° C. The catalyst contained 0.1% palladium, 0.05% silver and 5% ferric oxide.

At a temperature of 165° C. and a pressure of 30 atmospheres, at a rate of 600 liters per hour (reduced to normal pressure), a gas identical to the one described in Example 2 was conducted over 100 ml. of the catalyst. The hydrogenated gas contained less than 0.001% by volume acetylene and 0.95% by volume hydrogen.

It is to be understood that the foregoing disclosure describes only preferred embodiments of the invention, given for purposes of illustration, and the true scope of the invention is to be interpreted from the appended claims.

What we claim is:

1. A catalyst for the selective hydrogenation of acetylene to ethylene, said catalyst consisting essentially of α-alumina as inert carrier supporting as active components palladium, silver, and iron, said palladium and silver being present in amounts up to 5% by weight of the entire catalytic mass, and the iron component being present as ferric oxide in an amount between 19 to 80 times the combined weight of said palladium and silver components.

2. A catalyst according to claim 1, wherein the amount of said palladium is 60 to 99% by weight of the combined amount of palladium and silver in said catalyst.

3. A catalyst for the selective hydrogenation of acetylene to ethylene, consisting essentially of 0.1% by weight palladium, 0.005% by weight silver, and 2 to 7% by weight ferric oxide all supported by α-alumina.

4. A catalyst according to claim 3, wherein the concentration of said ferric oxide is 5% by weight.

5. A catalyst for the selective hydrogenation of acetylene to ethylene, consisting essentially of 0.1% by weight palladium, 0.05% by weight silver and 5% ferric oxide all supported by α-alumina.

References Cited by the Examiner

UNITED STATES PATENTS

| | | | |
|---|---|---|---|
| 2,927,141 | 3/1960 | Cohn et al. | 260—677 |
| 3,076,858 | 2/1963 | Frevel et al. | 260—677 |
| 3,113,980 | 12/1963 | Robinson | 252—466 X |
| 3,155,739 | 11/1964 | Fleming | 260—677 |
| 3,167,498 | 1/1965 | Kronig et al. | 260—677 |

OTHER REFERENCES

Bond et al.: "Farady Society, Transactions," vol. 54, part 10, October 1958, pp. 1537—46.

BENJAMIN HENKIN, *Primary Examiner.*

ALPHONSO D. SULLIVAN, MAURICE A. BRINDISI, *Examiners.*

D. S. ABRAMS, G. OZAKI, *Assistant Examiners.*